(12) United States Patent
Nakamura et al.

(10) Patent No.: US 12,335,644 B2
(45) Date of Patent: Jun. 17, 2025

(54) SOLID-STATE IMAGING DEVICE, SIGNAL PROCESSING METHOD, AND ELECTRONIC DEVICE

(71) Applicant: SONY SEMICONDUCTOR SOLUTIONS CORPORATION, Kanagawa (JP)

(72) Inventors: Nobuo Nakamura, Kanagawa (JP); Toshiki Itagaki, Kanagawa (JP); Takashi Miyamoto, Kanagawa (JP); Shin Hotta, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 41 days.

(21) Appl. No.: 18/043,758

(22) PCT Filed: Aug. 31, 2021

(86) PCT No.: PCT/JP2021/031815
§ 371 (c)(1),
(2) Date: Mar. 2, 2023

(87) PCT Pub. No.: WO2022/054627
PCT Pub. Date: Mar. 17, 2022

(65) Prior Publication Data
US 2023/0319434 A1 Oct. 5, 2023

(30) Foreign Application Priority Data

Sep. 14, 2020 (JP) ................................ 2020-153884

(51) Int. Cl.
*H04N 25/703* (2023.01)
*G06F 21/16* (2013.01)
(Continued)

(52) U.S. Cl.
CPC .......... *H04N 25/703* (2023.01); *G06T 1/005* (2013.01)

(58) Field of Classification Search
CPC .............. H04N 25/703; H04N 21/2351; H04N 21/8358; G06T 1/005; G06F 21/16; H04L 9/0866; H04L 9/0894; H04L 9/3278
See application file for complete search history.

(56) References Cited

U.S. PATENT DOCUMENTS

| 11,637,982 | B2* | 4/2023 | Okura | ................... | H04N 25/76 |
| | | | | | 348/308 |
| 2018/0205901 | A1* | 7/2018 | Okura | ................... | H04N 25/60 |
| 2020/0288078 | A1* | 9/2020 | Okura | .................. | H04N 25/702 |

FOREIGN PATENT DOCUMENTS

| JP | 2007-528644 A | 10/2007 |
| JP | 2020-027033 A | 2/2020 |
| JP | 2020-145533 A | 9/2020 |

OTHER PUBLICATIONS

International Search Report and Written Opinion of PCT Application No. PCT/JP2021/031815, issued on Nov. 16, 2021, 10 pages of ISRWO.

\* cited by examiner

*Primary Examiner* — Ahmed A Berhan
(74) *Attorney, Agent, or Firm* — CHIP LAW GROUP

(57) ABSTRACT

The present technology relates to a solid-state imaging device, a signal processing method, and an electronic device enabling improvement of evidence capability of an image. The imaging device generates image information in a pixel unit, generates additional information to be added to the image information outputted from the pixel unit, and combines the additional information with the image information. The present technology can be applied to an imaging device including an image sensor.

19 Claims, 12 Drawing Sheets

(51) Int. Cl.
*G06T 1/00* (2006.01)
*H04L 9/08* (2006.01)
*H04N 21/235* (2011.01)
*H04N 21/8358* (2011.01)

FIG. 3

| | PLACE TO BE ADDED | |
|---|---|---|
| | GENERATED IN PIXEL UNIT | GENERATED IN LOGIC CIRCUIT UNIT |
| ADDITIONAL INFORMATION — ID INFORMATION | ⟨INDIVIDUAL INFORMATION⟩<br>- FIXED PATTERN NOISE<br>- VARIATION IN SENSITIVITY<br>- PUF (DARK STATE)<br>- PUF (BRIGHT STATE)<br>... | ⟨SENSOR INFORMATION⟩<br>- MANUFACTURING CONDITION<br>- SENSOR PRODUCT NAME<br>- NUMBER OF PIXELS<br>- MANUFACTURING PLACE<br>- MANUFACTURING DATE<br>- IDENTIFICATION NUMBER<br>- CUSTOMER NAME<br>...<br>⟨INDIVIDUAL INFORMATION⟩<br>- FIXED PATTERN NOISE<br>- VARIATION IN SENSITIVITY<br>- PUF (DARK STATE)<br>- PUF (BRIGHT STATE)<br>...<br>⟨CAMERA INFORMATION⟩<br>- CAMERA PRODUCT NAME<br>- CAMERA IMAGE-CAPTURING ENVIRONMENT (GPS INFORMATION, SOUND INFORMATION, CHARACTER INFORMATION)<br>- IMAGE-CAPTURING DATE<br>... |
| ADDITIONAL INFORMATION — IMAGE SPECIFICATION INFORMATION | | - Robust Hash FUNCTION<br>- INFORMATION INDICATING FEATURE AMOUNT OF IMAGE<br>- IMAGE SERIAL NUMBER<br>- ELECTRONIC WATERMARK<br>... |

SOLID-STATE IMAGING DEVICE, SIGNAL PROCESSING METHOD, AND ELECTRONIC DEVICE

CROSS REFERENCE TO RELATED APPLICATIONS

This application is a U.S. National Phase of International Patent Application No. PCT/JP2021/031815 filed on Aug. 31, 2021, which claims priority benefit of Japanese Patent Application No. JP 2020-153884 filed in the Japan Patent Office on Sep. 14, 2020. Each of the above-referenced applications is hereby incorporated herein by reference in its entirety.

TECHNICAL FIELD

The present technology relates to a solid-state imaging device, a signal processing method, and an electronic device, and particularly relates to a solid-state imaging device, a signal processing method, and an electronic device capable of improving evidence capability of an image.

BACKGROUND ART

Regarding images acquired by a charge coupled device (CCD) image sensor, a complementary metal oxide semiconductor (CMOS) image sensor, and the like, whether or not an image captured at a certain place, at a certain time, or by a predetermined camera (such as a smartphone) is authentic has been important. A purpose of an image in a social networking service (SNS) or a smartphone is to be widely known by being viewed and shared by other people. In such an image, it is important that the image itself is not subjected to malicious processing.

Therefore, in particular, it is necessary to "guarantee the evidence capability of the image" to enable determination as to whether the image is a fake image or a real image.

There have been many studies on images that enhance the evidence capability. A method of embedding an electronic watermark, a Robust Hash function, or the like in each image has been studied (for example, Patent Document 1).

CITATION LIST

Patent Document

Patent Document 1: Japanese Patent Application Laid-Open No. 2007-528644

SUMMARY OF THE INVENTION

Problems to be Solved by the Invention

However, these studies are performed on images, and no attempt is made to enhance the "evidence capability" in consideration of an output of an image sensor itself. In a case of enhancing the "evidence capability", it is desirable to have a mechanism capable of specifying even an image sensor and a camera.

The present technology has been made in view of such a situation, and an object thereof is to improve the evidence capability of an image.

Solutions to Problems

A solid-state imaging device according to one aspect of the present technology includes: a pixel unit configured to generate image information; an information generation unit configured to generate additional information to be added to the image information outputted from the pixel unit; and an image composition unit configured to combine the additional information with the image information.

In one aspect of the present technology, image information is generated in the pixel unit, and additional information to be added to the image information outputted from the pixel unit is generated. Then, the additional information is combined with the image information.

BRIEF DESCRIPTION OF DRAWINGS

FIG. 3 is a view illustrating an example of additional information.

MODE FOR CARRYING OUT THE INVENTION

Hereinafter, an embodiment for implementing the present technology will be described. The description will be given in the following order.

1. Basic Configuration
2. Details
3. Operation
4. Other

1. Basic Configuration

<Configuration Example of Imaging Device>

Figure 1:
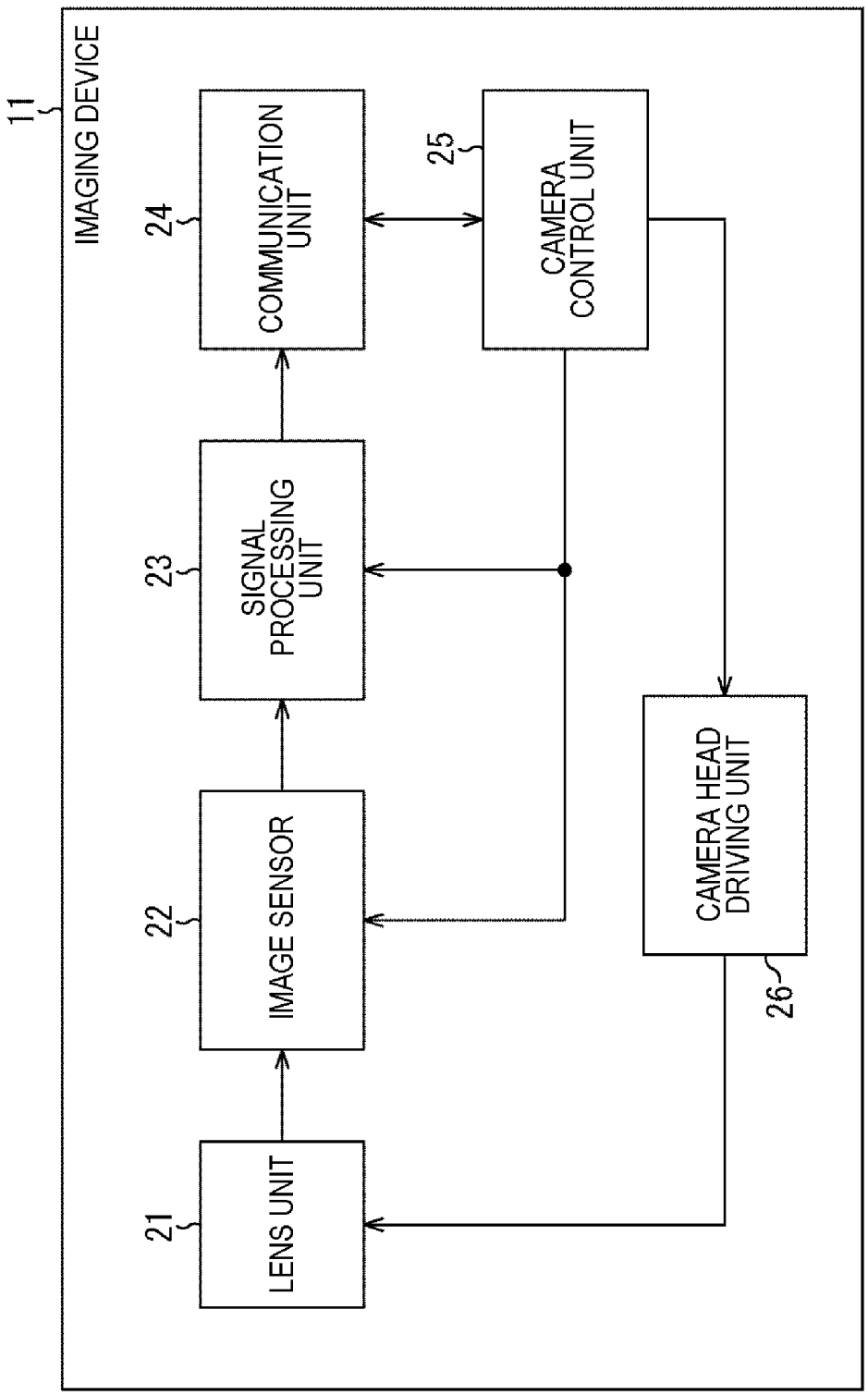
FIG. 1 is a block diagram illustrating a configuration of an embodiment of an imaging device as an electronic device to which the present technology is applied.

FIG. 1 is a block diagram illustrating a configuration of an embodiment of an imaging device as an electronic device to which the present technology is applied.

An imaging device 11 in FIG. 1 includes a lens unit 21, an image sensor 22, a signal processing unit 23, a communication unit 24, a camera control unit 25, and a camera head driving unit 26.

The lens unit 21 includes a lens that adjusts a focus to a subject and collects light reflected on the subject, a diaphragm that adjusts exposure, and the like.

The image sensor 22 is configured with a complementary metal oxide semiconductor (CMOS) image sensor, a charge coupled device (CCD) image sensor, or the like. The image sensor 22 photoelectrically converts light from the subject, generates image information, and outputs as an image signal to the signal processing unit 23. The image sensor 22 adds identification information for identifying the image sensor 22 and the imaging device 11 or image specification information for specifying a captured image (hereinafter, also collectively referred to as additional information), to the image information of the captured image. Note that, in this specification, adding information is synonymous with embedding information.

The signal processing unit 23 is configured with a field programmable gate array (FPGA), a digital signal processor (DSP), or the like. The signal processing unit 23 performs signal processing such as color mixing correction, black level correction, white balance adjustment, demosaic processing, matrix processing, gamma correction, and YC conversion on an image signal supplied from the image sensor 22. The signal processing unit 23 outputs the image signal after the signal processing to the communication unit 24.

The communication unit 24 transmits the image signal to a server (not illustrated) or another device via a network. The communication unit 24 receives a control signal or the like corresponding to a user's operation received via the network, and outputs the control signal or the like to the camera control unit 25.

The camera control unit 25 includes, for example, a central processing unit (CPU), a read only memory (ROM), a random access memory (RAM), and the like, and controls each unit of the imaging device 11 by executing a program and processing data.

For example, the camera control unit 25 controls to drive the image sensor 22 by generating a synchronization signal and supplying the synchronization signal to the image sensor 22, to control imaging.

For example, the camera control unit 25 controls switching of whether or not to add additional information to image information of a captured image in the image sensor 22. The camera control unit 25 can also control a position to which the additional information is added in the image information.

The camera head driving unit 26 drives the lens and the diaphragm included in the lens unit 21, and controls a focal length, exposure, and the like.

<Configuration Example of Image Sensor>

Figure 2:
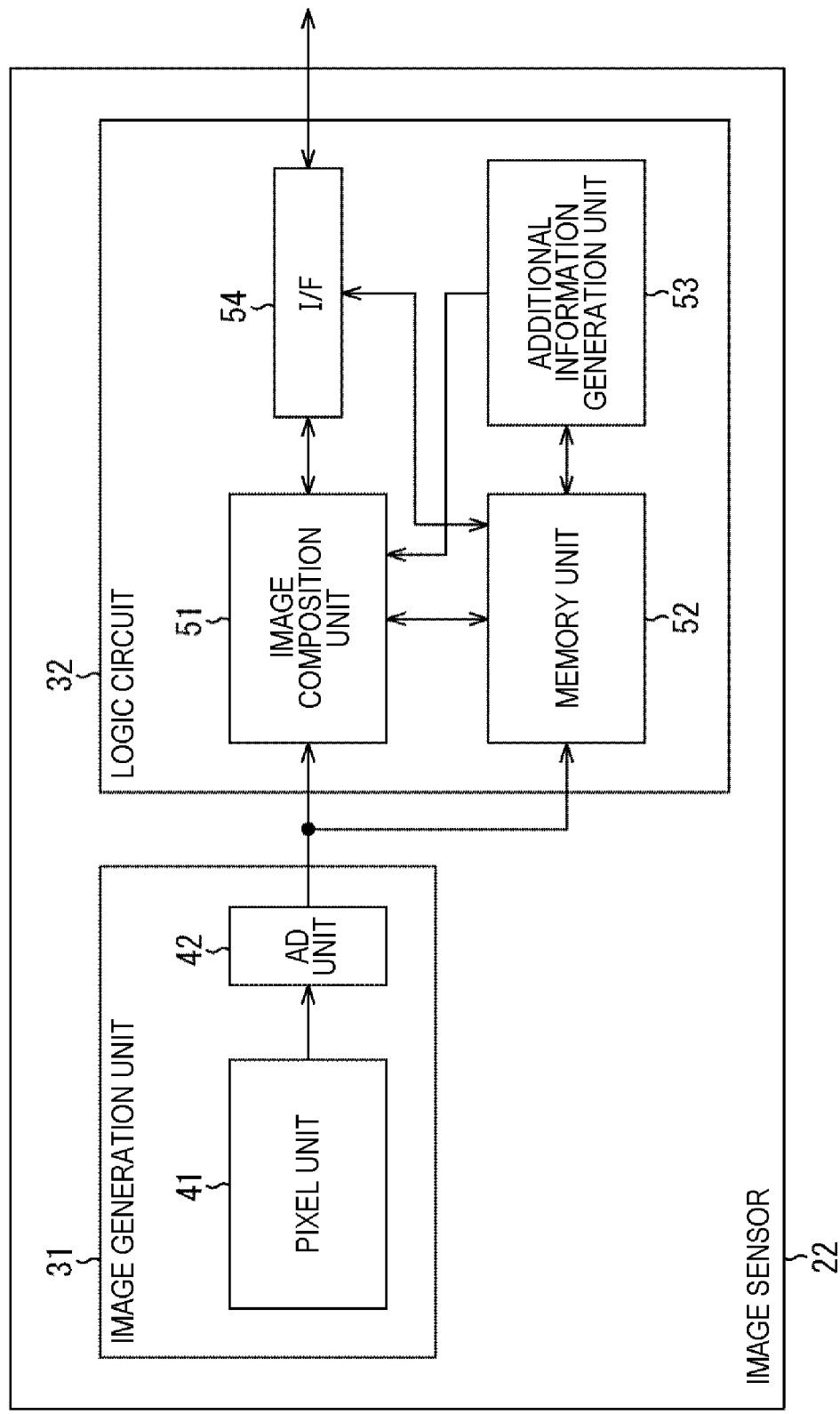
FIG. 2 is a block diagram illustrating a configuration example of an image sensor.

FIG. 2 is a diagram illustrating a configuration example of the image sensor 22.

The image sensor 22 includes an image generation unit 31 and a logic circuit 32.

The image generation unit 31 includes a pixel unit 41 and an analog/digital (AD) unit 42.

The pixel unit 41 receives incident light, performs photoelectric conversion, accumulates signal charges, and generates image information. In the pixel unit 41, two-dimensional information is acquired since unit pixels are arranged two-dimensionally.

In addition to the generation of the image information, the pixel unit 41 performs adding of additional information (identification information), generation of random number information, and the like under control of the camera control unit 25.

The AD unit 42 is arranged in a column region or a pixel region of the image generation unit 31. The AD unit 42 converts analog image information outputted from the pixel unit 41 into digital image information. The AD unit 42 outputs image information to the logic circuit 32.

The logic circuit 32 includes an image composition unit 51, a memory unit 52, an additional information generation unit 53, and an interface (I/F) 54.

Note that, in a case where the additional information is added in the logic circuit 32 under control of the camera control unit 25, an image signal is outputted to the image composition unit 51 and the memory unit 52. In a case where the additional information is not added in the logic circuit 32, the image information is outputted only to the image composition unit 51.

The image composition unit 51 combines the digital image information supplied from the AD unit 42 with the additional information generated by the additional information generation unit 53, and outputs image information as a composition result to the I/F 54. In a case where the additional information is not generated, the image composition unit 51 outputs the digital image information supplied from the AD unit 42 to the I/F 54.

The memory unit 52 is configured with an SRAM, a DRAM, an FE-RAM, an M-RAM, or the like. The memory unit 52 holds the digital image information supplied from the AD unit 42.

Furthermore, the memory unit 52 holds a random number and the identification information generated in the pixel unit 41 and supplied from the AD unit 42. As necessary, the memory unit 52 holds camera information regarding the imaging device 11 and acquired via the I/F 54, and sensor information regarding the image sensor 22 and acquired from a non-volatile memory in the logic circuit 32.

Note that the memory unit 52 may be configured with a chip same as the image sensor 22, or may be configured with a chip separate from the image sensor 22. In a case where the memory unit 52 and the image sensor 22 are configured by different chips, the memory unit 52 is integrated with the image sensor 22 in a package or in a system of the imaging device.

The additional information generation unit 53 generates additional information with reference to the image information, the random number, the identification information, the camera information, the sensor information, and the like held in the memory unit 52. In particular, image specification information is generated with reference to the image information held in the memory unit 52. The additional information may be encrypted. At this time, a random number generated in the pixel unit 41 or a random number generated in a built-in pseudo random number generator is used for encryption.

In an image, whether a position at which the additional information is added is an OPB region where an optical signal is shielded or an effective region where an optical signal is irradiated, for example, can be set in accordance with control of the camera control unit 25. Furthermore, in a case where the additional information is added to the effective region, the additional information generation unit 53 refers to brightness and contents of the image information held in the memory unit 52, and generates the additional information so that the additional information is added to a position where quality of the effective region is not degraded.

The additional information generation unit 53 outputs the generated additional information to the image composition unit 51. For example, the generated additional information is converted into a bit string of 0 and 1 or encrypted as described above by the additional information generation unit 53, and is combined with the image information of the pixel unit 41 by the image composition unit 51.

The I/F 54 outputs the image information supplied from the image composition unit 51, to the signal processing unit 23. Furthermore, the I/F 54 acquires camera information and the like from a non-volatile memory (not illustrated) provided outside the image sensor 22 in the imaging device 11, and outputs the camera information and the like to the memory unit 52.

<Example of Additional Information>

FIG. 3 is a view illustrating an example of the additional information.

The additional information includes information generated by the pixel unit 41 and information generated by the logic circuit 32. Which one or both of the pixel unit 41 and the logic circuit 32 generates the information can be set, for example, in accordance with control of the camera control unit 25. Types of the additional information include identification (ID) information and image specification information.

The additional information generated by the pixel unit 41 includes identification information.

The identification information is individual information for identifying the pixel unit 41 itself. The individual information includes fixed pattern noise, variation in sensitivity, a physically unclonable function (PUF) of a dark state generated in a dark state, and a PUF of a bright state generated in a bright state. Under control of the camera control unit 25, the individual information is generated in the pixel unit 41, added to the image information, and outputted to the memory unit 52 of the logic circuit 32.

The additional information generated by the logic circuit 32 includes identification information and image specification information.

The identification information includes sensor information, the individual information described above, and camera information.

The sensor information is information regarding the image sensor 22, and is held in, for example, a non-volatile memory such as an EEPROM (not illustrated) in the logic circuit 32. The sensor information is read from the non-volatile memory and supplied to the memory unit 52 as necessary.

The sensor information includes a manufacturing condition, a sensor product name, the number of pixels, a manufacturing date, an identification number, a customer name, and the like.

The camera information is information regarding the imaging device 11, and is held in a non-volatile memory (not illustrated) or the like in the imaging device 11. The camera information is read from the non-volatile memory, and supplied to the memory unit 52 via the I/F 54 as necessary.

The camera information includes a camera product name, camera identification information, information indicating a camera image-capturing environment, and an image-capturing date. The information indicating the camera image-capturing environment includes global positioning system (GPS) information, sound information, character information, and the like at a time of image-capturing.

The image specification information is information generated on the basis of image information held in the memory unit 52, and includes a Robust Hash function, information indicating a feature amount of an image, an image serial number, an electronic watermark, and the like.

The additional information generated by the logic circuit 32 may be directly combined with the image information, but is combined with the image information by using encryption with a random number or the like or electronic watermark technology as necessary. At this time, as the random number, a random number generated by the pixel unit 41 or a random number generated by a pseudo random number generator built in the additional information generation unit 53 is used. Furthermore, for example, an electronic watermark is combined into the image information by using electronic watermark technology.

2. Details

<Example of Image Information>

Figure 4:
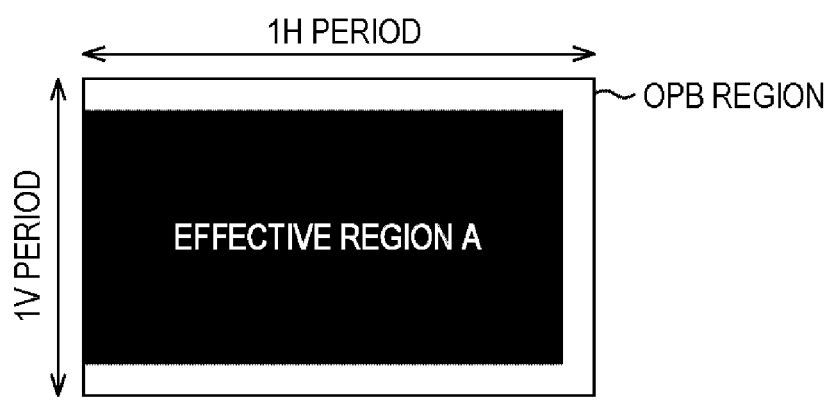
FIG. 4 is a view illustrating an example of image information.

FIG. 4 is a view illustrating an example of image information outputted from the image generation unit 31 to the logic circuit 32.

The image information includes image information of a 1H (horizontal blanking) period and a 1V (vertical blanking) period.

In the image information, TOP_V of several rows downward from an upper left pixel, BOTTOM_V of several rows upward from a lower left pixel, and RIGHT_H of several columns from the upper right to left are OPB regions in which an optical signal is shielded.

In the image information, a region excluding the OPB region is an effective region A irradiated with an optical signal.

In the pixel unit 41, individual information is generated as the additional information. The generated additional information is added to image information, or outputted to the logic circuit 32 and added to image information in the logic circuit 32.

The additional information is added to at least one of the OPB region or the effective region A in the image information, in accordance with control of the camera control unit 25. In the effective region A, the additional information can be embedded entirely or can be embedded partially. Furthermore, the additional information is added by at least one of the pixel unit 41 or the logic circuit 32, in accordance with control of the camera control unit 25.

Note that, in this specification, an example will be described in which the additional information is added to the OPB region in the TOP_V as an example of adding the additional information to the OPB region, but the additional information can also be added to the OPB region in the BOTTOM_V or the RIGHT_H.

Figure 5A:
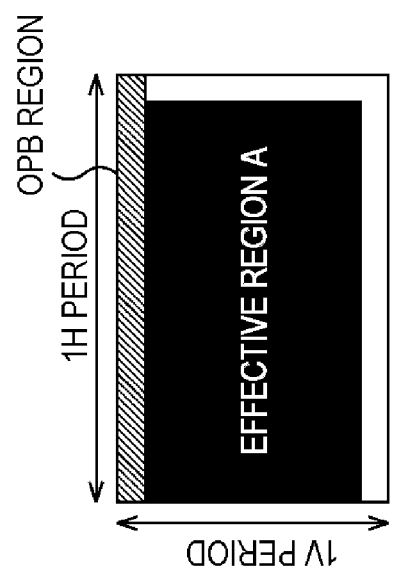
FIGS. 5A, 5B, and 5C are views illustrating an example of image information outputted from a logic circuit to a signal processing unit.
Figure 5B:
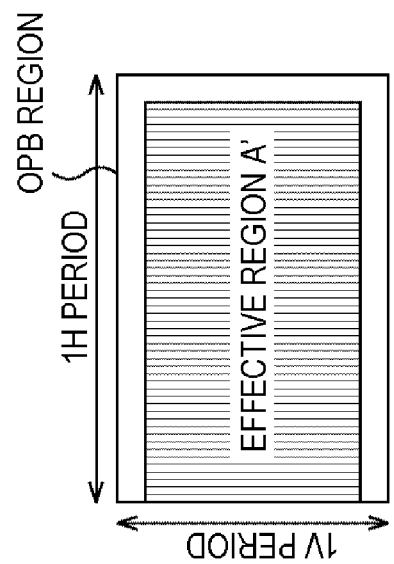
Figure 5C:
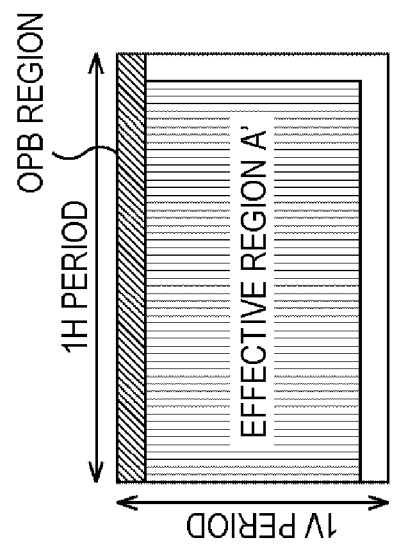

FIGS. 5A, 5B, and 5C are views illustrating an example of image information outputted from the logic circuit 32 to the signal processing unit 23.

To the image information outputted from the logic circuit 32 to the signal processing unit 23, additional information is added by the pixel unit 41 or the logic circuit 32.

FIG. 5A is a view illustrating image information in a state where the additional information is added to the OPB region.

In FIG. 5A, an oblique hatch in the OPB region indicates that the additional information is added to the OPB region in the TOP_V period.

Since the additional information is not added to the effective region A by adding the additional information to the OPB region, it is possible to prevent quality deterioration in the image information of the effective region A.

FIG. 5B is a view illustrating image information in a state where the additional information is added to the effective region A.

In FIG. 5B, an effective region A' indicates a region obtained by adding the additional information to the effective region A.

Since the image information is present in the effective region A, the additional information is added so as not to degrade quality of the image information. As a position to be added, the addition may be uniformly performed in the effective region, the addition may be performed with a position fixed, or the addition may be performed by adaptively selecting a position having a high image frequency.

FIG. 5C is a view illustrating image information in a state where the additional information is added to the OPB region and the effective region A'.

In FIG. 5C, for example, the individual information in the additional information is added to the OPB region by the pixel unit 41, and the image specification information in the additional information is added to the effective region A by the logic circuit 32 by using encryption technology or electronic watermark technology. In this way, addition may be performed at a position suitable for the information to be added.

Figure 6:
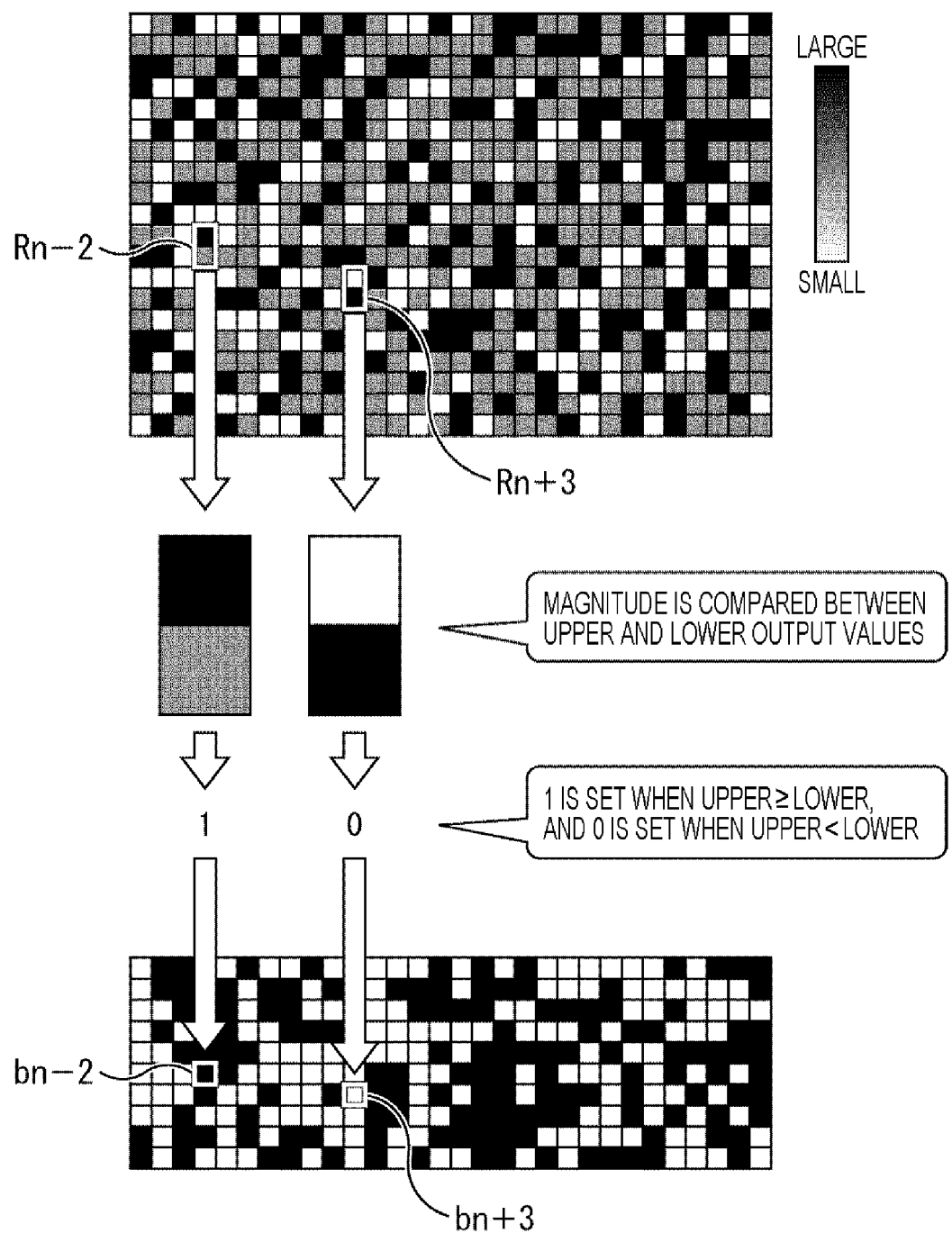
FIG. 6 is a view illustrating an example of adding a PUF as additional information to image information.

FIG. 6 is a view illustrating an example of adding a PUF as additional information to image information.

The PUF includes a PUF in a state where there is no optical signal (hereinafter, referred to as a dark state), a PUF in a state where there is an optical signal (hereinafter, referred to as a bright state), and the like.

In the dark state, for example, in the OPB region, a PUF generated due to Vth variation or the like of a transistor constituting a unit pixel is often used, since there is no optical signal.

In the OPB region, an analog voltage corresponding to Vth of an amplification transistor of the unit pixel is outputted to an output signal line of a source floor circuit. Since the Vth variation of the amplification transistor is a random event, individuality of the image sensor 22 is increased as the number of pixels in the OPB region is increased.

In the dark state, the Vth variation is larger than random noise in many cases, so that the PUF can be realized with one image in most cases. Therefore, it is possible to acquire a pixel signal for generating the PUF of a dark state without special ingenuity.

Specifically, in the dark state, an output voltage of a certain pixel is compared with an output voltage of a vertically adjacent pixel.

For example, as described with reference to FIG. 6, it is assumed that a height of an output voltage of each pixel in the OPB region is illustrated in an upper part. A dark density represents a case where the output voltage of the corresponding pixel is large, and a light density represents a case where the output voltage of the corresponding pixel is small. Furthermore, it is assumed that a comparison result of the output voltages of adjacent pixels is illustrated in a lower part.

As indicated by a row Rn−2 in the upper part, in a case where an output voltage of an upper pixel is larger than an output voltage of a lower pixel, the output voltage is converted into 1, and 1 indicated in black is added as information as indicated by a row bn−2 in the lower part. As indicated by a row Rn+3 in the upper part, in a case where an output voltage of an upper pixel is smaller than an output voltage of a lower pixel, the output voltage is converted into 0, and 0 indicated in white is added as information as indicated by a row bn+3 in the lower part.

Since a sequence of 0 and 1 is generated as described above, the image sensor 22 can be identified by adding the PUF of a dark state.

On the other hand, in the bright state when uniform light is incident on the image sensor 22, for example, there are bright pixels and dark pixels since sensitivity is different for each pixel in the effective region.

For example, as described again with reference to FIG. 6, it is assumed that the upper part shows luminance (brightness) of each pixel in the effective region. A dark density represents a case where the luminance of the corresponding pixel is large, and a light density represents a case where the luminance of the corresponding pixel is small. Furthermore, it is assumed that a comparison result of the luminance of adjacent pixels is illustrated in the lower part.

As indicated by the row Rn−2 in the upper part, in a case where a luminance of an upper pixel is larger than a luminance of a lower pixel, the luminance is converted into 1, and 1 indicated in black is added as information as indicated by the row bn−2 in the lower part. As indicated by the row Rn+3 in the upper part, in a case where a luminance of an upper pixel is smaller than a luminance of a lower pixel, the luminance is converted into 0, and 0 indicated in white is added as information as indicated by the row bn+3 in the lower part.

Since a sequence of 0 and 1 is generated as described above, the image sensor 22 can be identified by adding the PUF of a bright state.

Note that, in a case of the bright state, variation in optical signals (also referred to as shot noise) is often larger than variation in sensitivity. Therefore, in many cases, attempt is made to reduce variation in optical signals by acquiring and averaging a plurality of signals in the bright state.

<Generation Example of PUF of Dark State>

Figure 7:
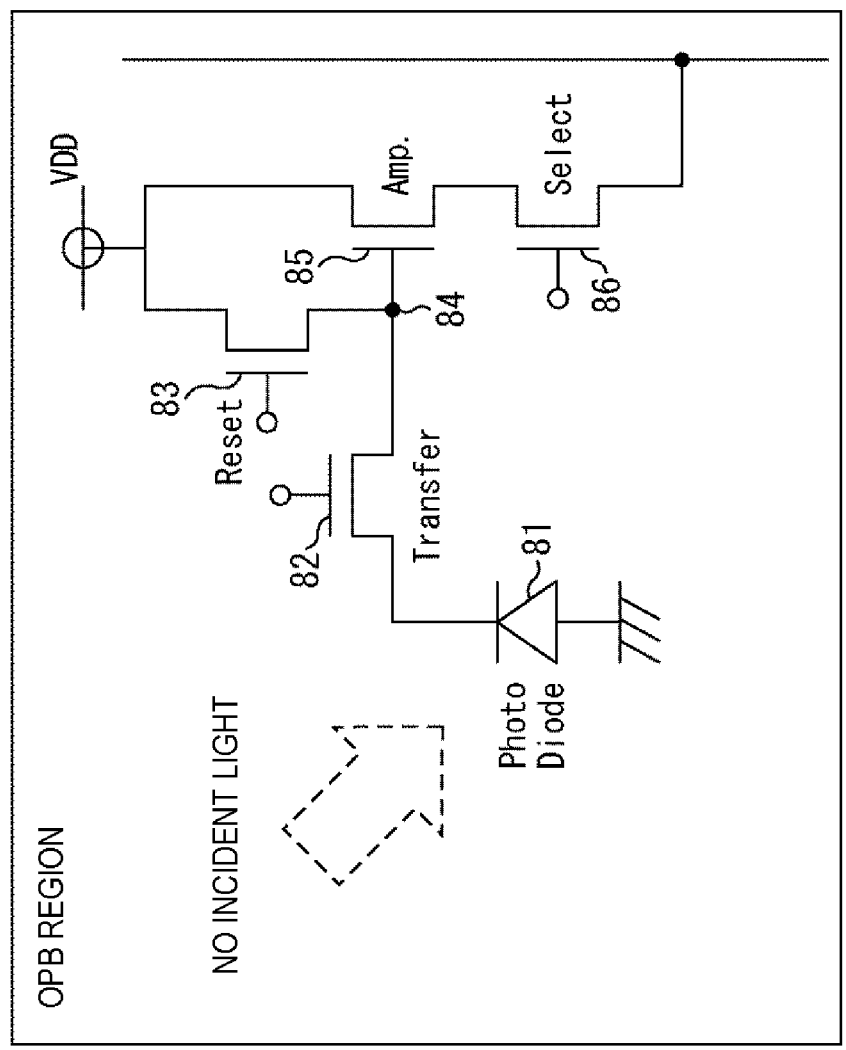
FIG. 7 is a diagram illustrating an example of generating a PUF of a dark state in an OPB region.

FIG. 7 is a diagram illustrating an example of generating a PUF of a dark state in the OPB region.

In FIG. 7, a pixel includes a photodiode 81, a transfer transistor 82, a reset transistor 83, a floating diffusion (FD) 84, an amplification transistor 85, and a selection transistor 86.

Note that the pixel in the OPB region is configured similarly to the pixel in the effective region. That is, in the OPB region, the pixel can be configured similarly to the pixel in the effective region even in a case where the PUF is generated.

In the pixel in the OPB region, in a case where there is no incident light and the reset transistor 83 is in an "ON" state, the FD 84 is defined by an external voltage VDD.

In this case, a value corresponding to Vth variation of the amplification transistor 85 is read to a vertical signal line. The value corresponding to Vth variation of the amplification transistor 85 is a voltage shifted by a threshold value Vth from a gate voltage Vfd of the amplification transistor 85.

Since this value corresponding to Vth variation of the amplification transistor 85 is unique to the image sensor 22, the PUF can be generated by using this value.

Figure 8:
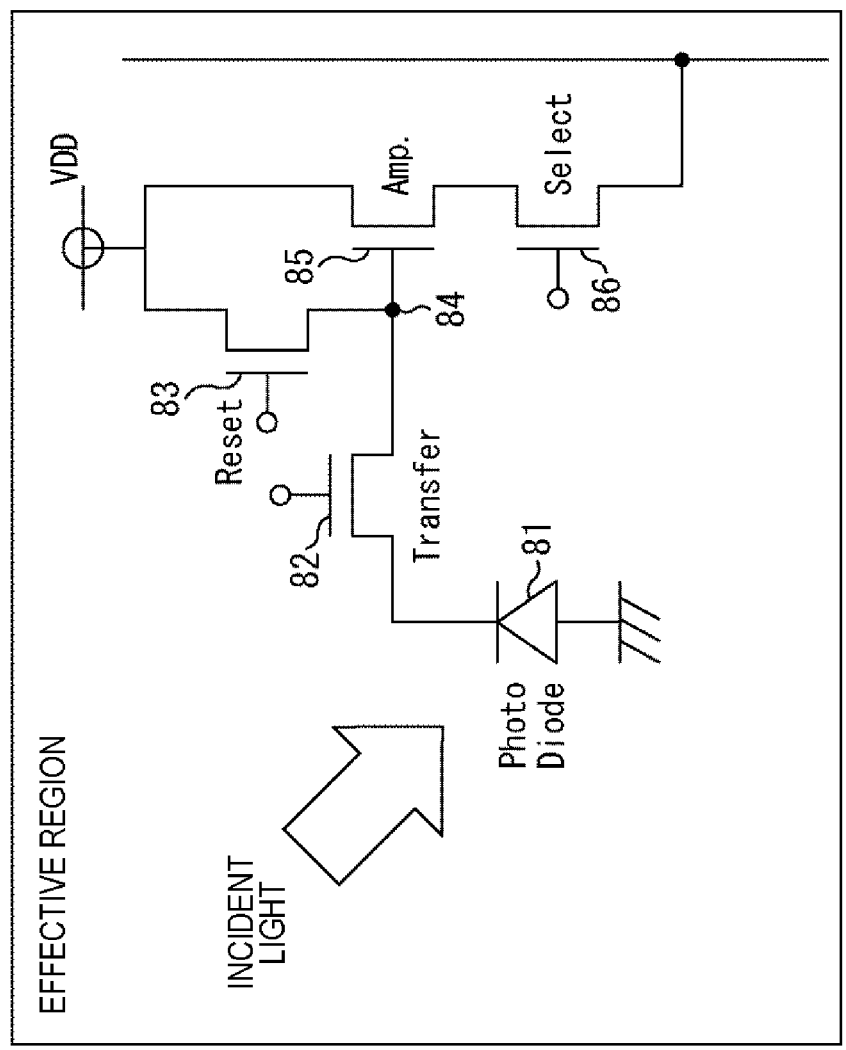
FIG. 8 is a diagram illustrating an example of generating a PUF of a dark state in an effective region.

FIG. 8 is a diagram illustrating an example of generating a PUF of a dark state in the effective region.

In FIG. 8, the pixel has a configuration similar to that in the case of FIG. 7. That is, the pixel includes the photodiode 81, the transfer transistor 82, the reset transistor 83, the FD 84, the amplification transistor 85, and the selection transistor 86.

In the pixel in the effective region, in a case where there is incident light and the reset transistor 83 is in an "OFF" state, a signal corresponding to a signal amount is read to the vertical signal line.

On the other hand, in the pixel in the effective region, in a case where there is incident light and the reset transistor 83 is in an "ON" state, as illustrated in FIG. 8, a value that is irrelevant to a signal amount and corresponds to Vth variation of the amplification transistor 85 is read to the vertical signal line.

Even in the case of FIG. 8, since this value corresponding to Vth variation of the amplification transistor 85 is unique to the image sensor 22, the PUF can be generated for each pixel by using this value.

<Random Number Generation Example>

Figure 9:
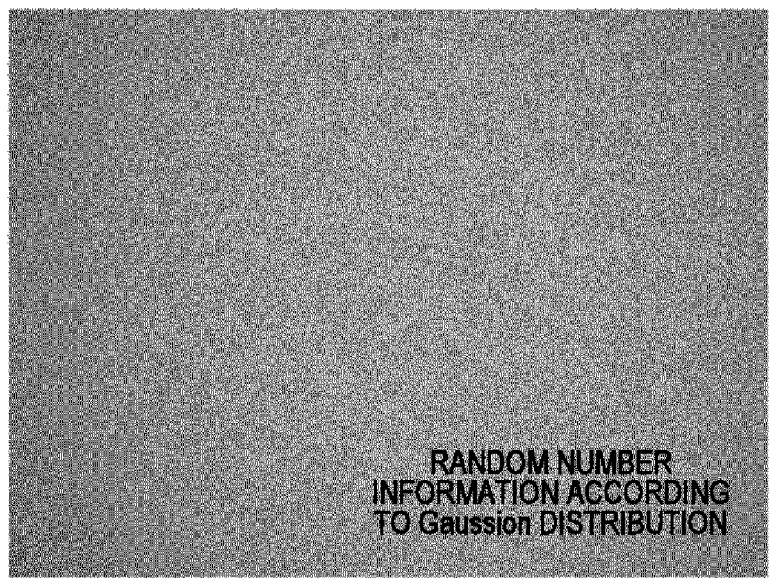
FIG. 9 is a view illustrating an example of random number information generated in a pixel unit.

FIG. 9 is a view illustrating an example of random number information generated in the pixel unit 41.

FIG. 9 illustrates random number information generated from random noise of an image in a dark state. The random number information in FIG. 9 is random number information according to Gaussian distribution, and is generated in each pixel of the OPB region described above with reference to FIG. 7.

As described again with reference to FIG. 7, in the pixel in the OPB region, when there is no incident light, and the reset transistor 83 is in the "OFF" state after switching ON and OFF, a random noise component is read to the FD 84 and the vertical signal line. This random noise component is thermal noise of a channel portion of a MOS transistor, kTC noise generated by resetting the FD 84, or the like.

The random noise component is read in this way, so that a random number can be generated in a hardware manner in a case of the dark state.

Figure 10:
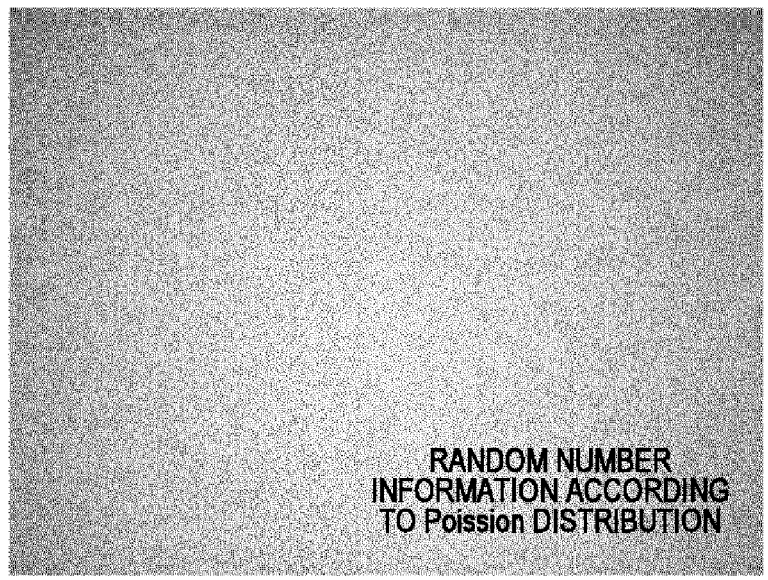
FIG. 10 is a view illustrating another example of random number information generated in the pixel unit.

FIG. 10 is a view illustrating another example of random number information generated in the pixel unit 41.

FIG. 10 illustrates random number information generated from shot noise (also referred to as photon shot noise) of an optical signal. The random number information illustrated in FIG. 10 is random number information according to Poisson distribution.

A pixel for generating this random number information physically exists in the OPB region described above with reference to FIG. 7, but the random number information is generated from shot noise of light incident on some pixels in the OPB region.

An output value of a photon signal of light varies due to an influence of statistical "fluctuation", even at the same time interval. By detecting this state, it is possible to generate a random number in a hardware manner in a case of the bright state.

3. Operation

<Example of Imaging Processing>

Figure 11:
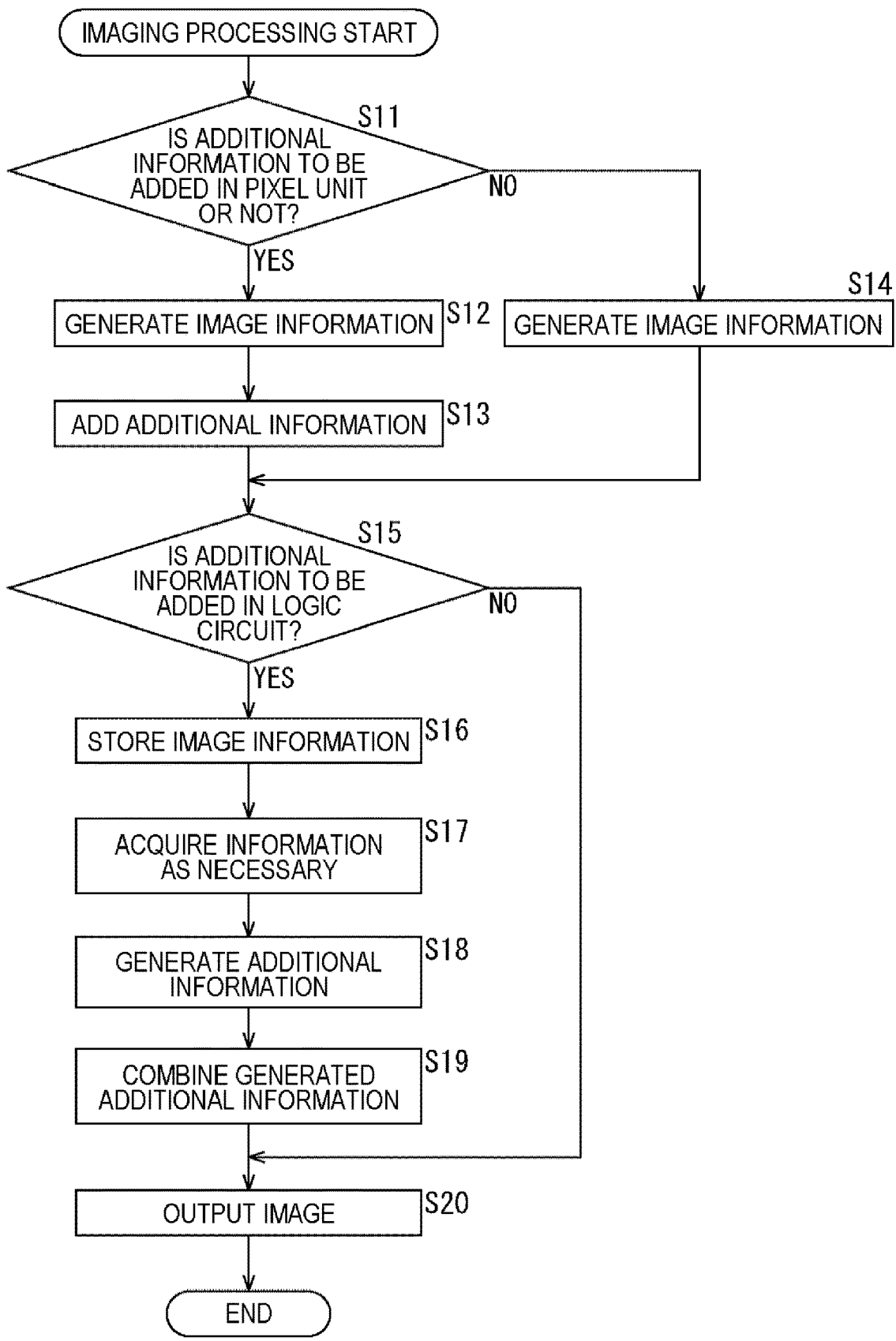
FIG. 11 is a flowchart for explaining imaging processing of the image sensor.

FIG. 11 is a flowchart for explaining imaging processing of the image sensor 22.

For example, additional information such as a necessary PUF, a random number, and the like are generated before imaging or the like in accordance with control of the camera control unit 25. Furthermore, which additional information is added in at least one of the pixel unit 41 or the logic circuit 32 is also set in accordance with control of the camera control unit 25.

In step S11, the image generation unit 31 determines whether or not to add additional information in the pixel unit 41. When it is determined in step S11 that the additional information is to be added in the pixel unit 41, the process proceeds to step S12.

In step S12, the pixel unit 41 receives incident light, performs photoelectric conversion, accumulates signal charges, and generates image information.

In step S13, the pixel unit 41 adds additional information to the generated image information.

In step S11, when it is determined that the additional information is not to be added in the pixel unit 41, the process proceeds to step S14.

In step S14, the pixel unit 41 receives incident light, performs photoelectric conversion, accumulates signal charges, and generates image information.

After step S13 or S14, the process proceeds to step S15.

In step S15, the logic circuit 32 determines whether or not to add additional information in the logic circuit 32 under control of the camera control unit 25. When it is determined in step S15 that the additional information is to be added in the logic circuit 32, the process proceeds to step S16. At this time, the AD unit 42 outputs image information to the image composition unit 51 and the memory unit 52.

In step S16, the memory unit 52 stores the image information from the AD unit 42.

In step S17, the logic circuit 32 acquires information as necessary. That is, the logic circuit 32 acquires a PUF and a random number from the pixel unit 41, acquires sensor information from a non-volatile memory of the logic circuit 32, and acquires camera information and the like from the inside of the imaging device 11. The acquired information is supplied to the memory unit 52.

In step S18, the additional information generation unit 53 refers to the information and the image information acquired in step S17 and stored in the memory unit 52, and generates the additional information described above with reference to FIG. 3. The additional information is subjected to encryption, electronic watermark technology, or the like as necessary. In a case of being added to the effective region, the additional information is generated so as to be added to a place where there is no deterioration in quality in consideration of image information (brightness and pattern) and the like in the effective region. The additional information is outputted to the image composition unit 51.

In step S19, the image composition unit 51 combines the additional information supplied from the additional information generation unit 53 with the image information supplied from the image generation unit 31.

Whereas, in step S15, when it is determined that the additional information is not to be added in the logic circuit 32, the process proceeds to step S20. At this time, the AD unit 42 outputs image information to the image composition unit 51.

In step S20, the image composition unit 51 outputs the image information as an image signal to the signal processing unit 23 via the I/F 54.

Since the additional information is added in the pixel unit 41 or the logic circuit 32 as described above, it is possible to improve evidence capability of an image.

Furthermore, since whether or not to add additional information can also be controlled, image information to which additional information is not added can also be generated.

4. Other

Effects of Present Technology

In the present technology, image information is generated, and additional information to be added to the image information outputted from the pixel unit is generated. Then, the additional information is combined with the image information.

As a result, the evidence capability of the image can be improved.

(Configuration Example of Computer)

The series of processing described above can be executed by hardware or software. In a case of executing the series of processing by software, a program that forms the software is installed from a program recording medium to a computer incorporated in dedicated hardware, to a general-purpose personal computer, or the like.

Figure 12:
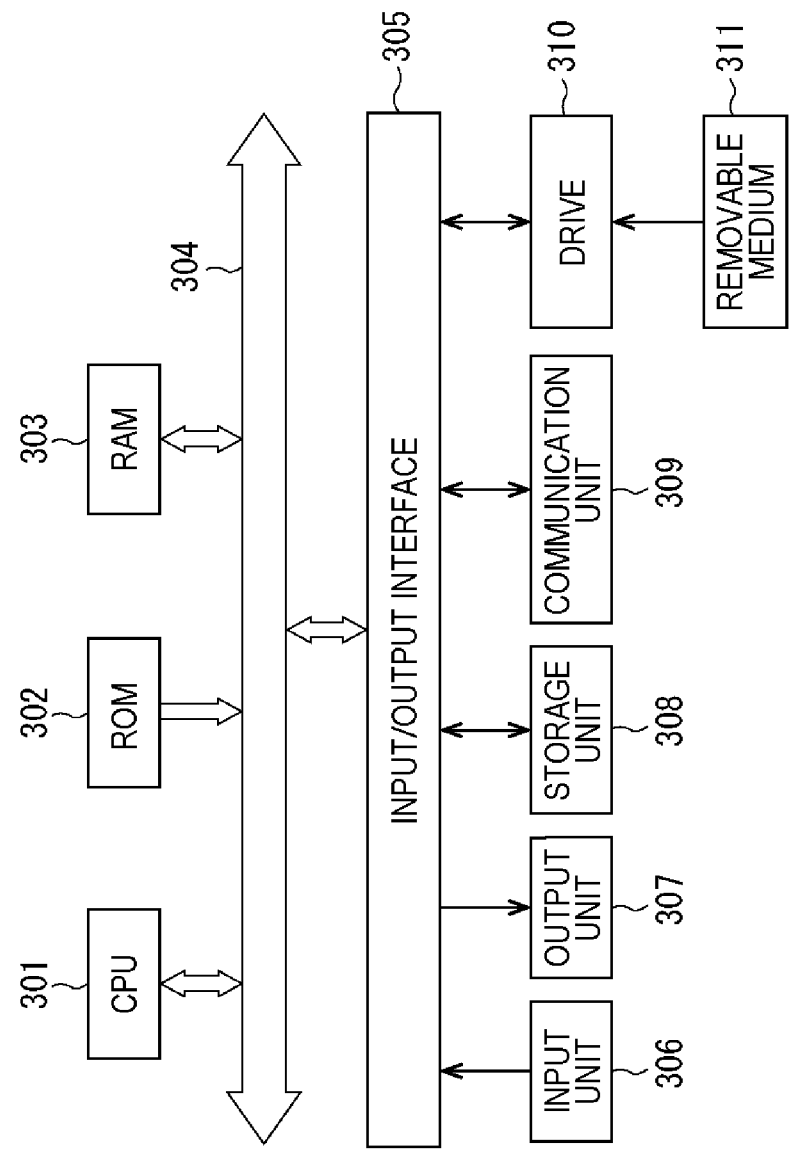
FIG. 12 is a block diagram illustrating a configuration example of a computer.

FIG. 12 is a block diagram showing a configuration example of hardware of a computer that executes the series of processes described above in accordance with a program.

A CPU 301, a read only memory (ROM) 302, and a RAM 303 are mutually connected by a bus 304.

The bus 304 is further connected with an input/output interface 305. The input/output interface 305 is connected with an input unit 306 including a keyboard, a mouse, and the like, and an output unit 307 including a display, a speaker, and the like. Furthermore, the input/output interface 305 is connected with a storage unit 308 including a hard disk, a non-volatile memory, and the like, a communication unit 309 including a network interface and the like, and a drive 310 that drives a removable medium 311.

In the computer configured as described above, the series of processing described above are performed, for example, by the CPU 301 loading a program recorded in the storage unit 308 into the RAM 303 via the input/output interface 305 and the bus 304, and executing.

The program to be executed by the CPU 301 is provided, for example, by being recorded on the removable medium 311 or via wired or wireless transfer media such as a local area network, the Internet, and digital broadcasting, to be installed in the storage unit 308.

Note that the program executed by the computer may be a program that performs processing in time series according to an order described in this specification, or may be a program that performs processing in parallel or at necessary timing such as when a call is made.

Note that, in this specification, the system means a set of a plurality of components (a device, a module (a part), and the like), and it does not matter whether or not all the components are in the same housing. Therefore, a plurality of devices housed in separate housings and connected via a network, and a single device with a plurality of modules housed in one housing are both systems.

Furthermore, the effects described in this specification are merely examples and are not limited, and other effects may also be present.

The embodiments of the present technology are not limited to the above-described embodiments, and various modifications can be made without departing from the scope of the present technology.

For example, the present technology can have a cloud computing configuration in which one function is shared and processed in cooperation by a plurality of devices via a network.

Furthermore, each step described in the above-described flowchart can be executed by one device, and also shared and executed by a plurality of devices.

Moreover, in a case where one step includes a plurality of processes, the plurality of processes included in the one step can be executed by one device, and also shared and executed by a plurality of devices.

<Combination Example of Configuration>

The present technology can also have the following configurations.

(1)
A solid-state imaging device including:
a pixel unit configured to generate image information;
an information generation unit configured to generate additional information to be added to the image information outputted from the pixel unit; and
an image composition unit configured to combine the additional information with the image information.

(2)
The solid-state imaging device according to (1) above, in which
the information generation unit encrypts the additional information, and
the image composition unit combines the encrypted additional information with the image information.

(3)
The solid-state imaging device according to (2) above, in which
the information generation unit encrypts the additional information with a random number generated from the pixel unit.

(4)
The solid-state imaging device according to any one of (1) to (3) above, in which
the additional information is identification information for identifying the solid-state imaging device.

(5)
The solid-state imaging device according to (4) above, in which
the identification information is a physically unclonable function (PUF) or information unique to the solid-state imaging device.

(6)
The solid-state imaging device according to (4) above, in which
the identification information is information regarding an electronic device on which the solid-state imaging device is mounted or information regarding the solid-state imaging device.

(7)
The solid-state imaging device according to (6) above, in which
the information regarding the electronic device includes GPS information, sound information, or character information regarding an environment in which the electronic device is used.

(8)
The solid-state imaging device according to any one of (1) to (3) above, further including:
a memory unit configured to store the image information, in which
the information generation unit generates the additional information on the basis of the image information stored in the memory unit.

(9)
The solid-state imaging device according to (8) above, in which
the additional information is image specification information for specifying the image information of the pixel unit.

(10)
The solid-state imaging device according to (9) above, in which
the image specification information is a Robust Hash function, feature amount information indicating a feature amount of the image information, an image serial number, or an electronic watermark.

(11)
The solid-state imaging device according to (8) above, in which
the memory unit includes a chip separate from the solid-state imaging device, and
the memory unit is integrated with the solid-state imaging device in a package or in a system of an electronic device.

(12)

The solid-state imaging device according to (8) above, in which
the memory unit is configured with an SRAM, a DRAM, an FE-RAM, or an M-RAM.

(13)

The solid-state imaging device according to any one of (1) or (4) to (11) above, in which
the information generation unit generates the additional information by using electronic watermark technology.

(14)

The solid-state imaging device according to any one of (1) to (13) above, in which
the information generation unit generates the additional information to be added to at least one region of an OPB region or an effective region in the image information of the pixel unit.

(15)

The solid-state imaging device according to any one of (1) to (14) above, further including:
a control unit configured to switch whether or not the information generation unit generates the additional information.

(16) The solid-state imaging device according to any one of (1) to (15) above, in which
the image information of the pixel unit includes identification information for identifying the solid-state imaging device.

(17)

The solid-state imaging device according to (16) above, in which
the identification information is a PUF or information unique to the solid-state imaging device.

(18)

The solid-state imaging device according to (16) or (17) above, in which
the identification information is added to at least one region of an OPB region or an effective region in the image information of the pixel unit.

(19)

The solid-state imaging device according to any one of (16) to (18) above, further including:
a control unit configured to switch whether or not to include the identification information in the image information of the pixel unit.

(20)

A signal processing method including,
by a solid-state imaging device:
generating image information in a pixel unit;
generating additional information to be added to the image information outputted from the pixel unit; and
combining the additional information with the image information.

(21)

An electronic device including:
a solid-state imaging device including
a pixel unit configured to generate image information,
an information generation unit configured to generate additional information to be added to the image information outputted from the pixel unit, and
an image composition unit configured to combine the additional information with the image information.

REFERENCE SIGNS LIST

11 Imaging device
21 lens unit
22 Image sensor
23 Signal processing unit
24 Communication unit
25 Camera control unit
26 Camera head driving unit
31 Image generation unit
32 Logic circuit
41 Pixel unit
42 AD unit
51 Image composition unit
52 Memory unit
53 Additional information generation unit
54 I/F

The invention claimed is:

1. A solid-state imaging device, comprising:
a plurality of pixels in a two-dimensional array, wherein the plurality of pixels is configured to generate image information; and
a central processing unit (CPU) configured to:
determine quality of the generated image information;
generate additional information based on the image information;
determine a specific position in the image information based on the determined quality; and
combine, at the determined specific position, the additional information with the image information.

2. The solid-state imaging device according to claim 1, wherein the CPU is further configured to:
encrypt the additional information, and
combine the encrypted additional information with the image information.

3. The solid-state imaging device according to claim 2, wherein
the plurality of pixels is further configured to generate a random number, and
the CPU is further configured to encrypt the additional information with the generated random number.

4. The solid-state imaging device according to claim 1, wherein
the additional information includes identification information, and
the CPU is further configured to identify the solid-state imaging device based on the identification information.

5. The solid-state imaging device according to claim 4, wherein
the identification information includes at least one of a physically unclonable function (PUF) or specific information, and
the specific information is associated with the solid-state imaging device.

6. The solid-state imaging device according to claim 4, wherein the identification information includes at least one of
first information associated with an electronic device, wherein the solid-state imaging device is on the electronic device, or
second information associated with the solid-state imaging device.

7. The solid-state imaging device according to claim 6, wherein the first information includes at least one of GPS information, sound information, or character information associated with an environment that surrounds the electronic device.

8. The solid-state imaging device according to claim 1, further comprising a memory unit configured to store the image information.

9. The solid-state imaging device according to claim 8, wherein
the additional information includes image specification information, and
the CPU is further configured to specify the image information based on the image specification information.

10. The solid-state imaging device according to claim 9, wherein
the image specification information includes at least one of a Robust Hash function, feature amount information, an image serial number, or an electronic watermark, and
the feature amount information indicates a feature amount of the image information.

11. The solid-state imaging device according to claim 8, wherein
the memory unit includes a chip, and
the memory unit is integrated with the solid-state imaging device in one of a package or a system of an electronic device.

12. The solid-state imaging device according to claim 1, wherein the CPU is further configured to generate the additional information based on an electronic watermark technology.

13. The solid-state imaging device according to claim 1, wherein
the CPU is further configured to generate the additional information in at least one of an OPB region or an effective region,
the specific position is in one of the OPB region or the effective region, and
each of the OPB region and the effective region is in the image information.

14. The solid-state imaging device according to claim 1, wherein
the image information includes identification information, and
the CPU is further configured to identify the solid-state imaging device based on the identification information.

15. The solid-state imaging device according to claim 14, wherein
the identification information includes at least one of a physically unclonable function (PUF) or specific information, and
the specific information is associated with the solid-state imaging device.

16. The solid-state imaging device according to claim 14, wherein
the CPU is further configured to add the identification information to at least one of an OPB region or an effective region,
the specific position is in one of the OPB region or the effective region, and
each of the OPB region and the effective region is in the image information.

17. The solid-state imaging device according to claim 1, wherein
the image information includes identification information, and
the CPU is further configured to control addition of the identification information to the image information.

18. A signal processing method, comprising:
in a solid-state imaging device:
generating image information;
determining quality of the generated image information;
generating additional information based on the image information;
determining a specific position in the image information based on the determined quality; and
combining, at the determined specific position, the additional information with the image information.

19. An electronic device, comprising:
a solid-state imaging device that includes:
a plurality of pixels in a two-dimensional array, wherein the plurality of pixels is configured to generate image information; and
a central processing unit (CPU) configured to:
determine quality of the generated image information;
generate additional information based on the image information;
determine a specific position in the image information based on the determined quality; and
combine, at the determined specific position, the additional information with the image information.

* * * * *